US011947272B2

(12) United States Patent
Suzuki et al.

(10) Patent No.: US 11,947,272 B2
(45) **Date of Patent: *Apr. 2, 2024**

(54) CONDUCTIVE ROLLER, IMAGE FORMING APPARATUS, AND INSPECTION METHOD FOR CONDUCTIVE ROLLER

(71) Applicant: NOK CORPORATION, Tokyo (JP)

(72) Inventors: Shogo Suzuki, Kanagawa (JP); Atsushi Ikeda, Kanagawa (JP); Satoshi Fukuoka, Kanagawa (JP); Kenji Sasaki, Kanagawa (JP)

(73) Assignee: NOK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/016,944

(22) PCT Filed: May 10, 2021

(86) PCT No.: PCT/JP2021/017766

§ 371 (c)(1),
(2) Date: Jan. 19, 2023

(87) PCT Pub. No.: WO2022/018932

PCT Pub. Date: Jan. 27, 2022

(65) Prior Publication Data

US 2023/0314979 A1 Oct. 5, 2023

(30) Foreign Application Priority Data

Jul. 20, 2020 (JP) ................................. 2020-123422

(51) Int. Cl.
*G03G 15/02* (2006.01)
*G03G 15/00* (2006.01)

(52) U.S. Cl.
CPC ......... *G03G 15/0233* (2013.01); *G03G 15/50* (2013.01); *G03G 2215/025* (2013.01)

(58) Field of Classification Search
CPC ............... G03G 15/0233; G03G 15/50; G03G 2215/025
See application file for complete search history.

(56) References Cited

U.S. PATENT DOCUMENTS 5,571,457 A 11/1996 Vreeland et al.
2011/0299887 A1 12/2011 Miyaji et al.
(Continued)

FOREIGN PATENT DOCUMENTS

JP 2003-202722 A 7/2003
JP 3655364 B2 6/2005
(Continued)

OTHER PUBLICATIONS

ISR for PCT/JP2021/017766, dated Jun. 29, 2021 (w/ translation).
ISR for PCT/JP2021/017766, dated Jul. 13, 2021 (w/ translation).

*Primary Examiner* — Joseph S Wong
(74) *Attorney, Agent, or Firm* — GREENBLUM & BERNSTEIN, P.L.C.

(57) ABSTRACT

A conductive roller includes: a core member including an outer surface along and about an axial line thereof; and a surface layer arranged along the outer surface of the core member. The surface layer includes a conductive portion formed of a conductive resin composition, and a surface roughness imparting material in a form of particles dispersed in the conductive portion. An average particle size of the surface roughness imparting material is in a range of 6 micrometers or greater and 10 micrometers or less. The number of particles of the surface roughness imparting material per unit area of the surface layer is in a range of $1.0\times10^4$ particles per $mm^2$ or greater and $2.0\times10^6$ particles per $mm^2$ or less. An average thickness of the surface layer is in a range of 3.0 micrometers or greater and 15.0 micrometers or less.

10 Claims, 2 Drawing Sheets

(56) References Cited

U.S. PATENT DOCUMENTS

| | | | | |
|---|---|---|---|---|
| 2016/0154366 | A1 | 6/2016 | Yamauchi et al. | |
| 2018/0136577 | A1* | 5/2018 | Saito | G03G 15/0233 |
| 2020/0363748 | A1* | 11/2020 | Minematsu | G03G 5/105 |
| 2022/0244658 | A1* | 8/2022 | Yamada | G03G 15/0233 |
| 2023/0288834 | A1* | 9/2023 | Suzuki | G03G 15/0233 429/53 |

FOREIGN PATENT DOCUMENTS

| | | | |
|---|---|---|---|
| JP | 2012-14141 | A | 1/2012 |
| JP | 2016-110121 | A | 6/2016 |
| WO | WO 2019/044829 | A1 | 3/2019 |

* cited by examiner

CONDUCTIVE ROLLER, IMAGE FORMING APPARATUS, AND INSPECTION METHOD FOR CONDUCTIVE ROLLER

TECHNICAL FIELD

The present invention relates to a conductive roller, to an image forming apparatus, and to an inspection method for a conductive roller.

BACKGROUND ART

A conductive roller such as a charging roller is generally used in an image forming apparatus, such as a printer or a copier, which is configured to form an image using toner on a recording medium such as a sheet of paper by an electrophotographic method.

For example, a charging roller described in Patent Document 1 includes a core bar and a conductive rubber layer formed on the core bar.

To reduce charging unevenness, Patent Document 1 defines a range of a ten-point height of irregularities Rz of a surface of the charging roller, and a range of a mean spacing between peaks Sm of the surface of the charging roller.

RELATED ART DOCUMENT

Patent Document

Patent Document 1: Japanese Patent Application Laid-Open Publication No. 2012-14141

SUMMARY OF THE INVENTION

Problem to be Solved by the Invention

To roughen a surface of a conductive roller, a method is used in which a surface roughness imparting material in the form of particles is dispersed on a surface of a conductive roller, for example. When the method is applied to a charging roller, electric discharge occurs between a surface of a photoreceptor and a region of a surface of the charging roller, the region having no surface roughness imparting material. Image quality depends on evenness of electric charge or discharge on the surface of the photoreceptor; thus, it is necessary to define a predetermined range of a discharge gap between the surface of the photoreceptor and the charging roller, and a predetermined range of a distance between discharging points.

However, the ten-point height of irregularities Rz and the mean spacing between peaks Sm defined in Patent Document 1 are each a calculated value that is affected by irregularities formed, regardless of whether the surface roughness imparting material is present; thus, the ten-point height of irregularities Rz and the mean spacing between peaks Sm are not sufficiently correlated with a discharge gap or a distance between discharging points. Therefore, even when a surface roughness imparting material is applied to the charging roller described in Patent Document 1, it is necessary to output an actual image so as to determine whether desired image quality is obtained, which requires much time and effort.

Means of Solving the Problem

To solve the above problem, a conductive roller according to one aspect of the present invention includes: a core member including an outer surface along and about an axial line thereof; and a surface layer arranged along the outer surface of the core member, wherein: the surface layer includes: a conductive portion; and a surface roughness imparting material in the form of particles dispersed in the conductive portion, an average particle size of the surface roughness imparting material is in a range of 6 micrometers or greater and 10 micrometers or less, the number of particles of the surface roughness imparting material per unit area of the surface layer is in a range of $1.0\times10^4$ particles per $mm^2$ or greater and $2.0\times10^6$ particles per $mm^2$ or less, and an average thickness of the surface layer is in a range of 3.0 micrometers or greater and 15.0 micrometers or less.

An image forming apparatus according to one aspect of the present invention includes: the conductive roller described above, and a photoreceptor in contact with, or close to, the conductive roller.

An inspection method for a conductive roller according to one aspect of the present invention is an inspection method for determining whether characteristics of the conductive roller are good, the conductive roller including: a core member including an outer surface along and about an axial line thereof; and a surface layer arranged along the outer surface of the core member, the surface layer including: a conductive portion; and a surface roughness imparting material in a form of particles dispersed in the conductive portion, an average particle size of the surface roughness imparting material being in a range of 6 micrometers or greater and 10 micrometers or less, and an average thickness of the surface layer being in a range of 3.0 micrometers or greater and 15.0 micrometers or less, the inspection method including: calculating a number of particles of the surface roughness imparting material per unit area of the surface layer; and determining, based on the number of particles being in a range of $1.0\times10^4$ particles per $mm^2$ or greater and $2.0\times10^6$ particles per $mm^2$ or less, that the characteristics of the conductive roller are good.

Effects of Invention

According to the present invention, it is possible to reduce image unevenness.

MODES FOR CARRYING OUT THE INVENTION

Figure 1:
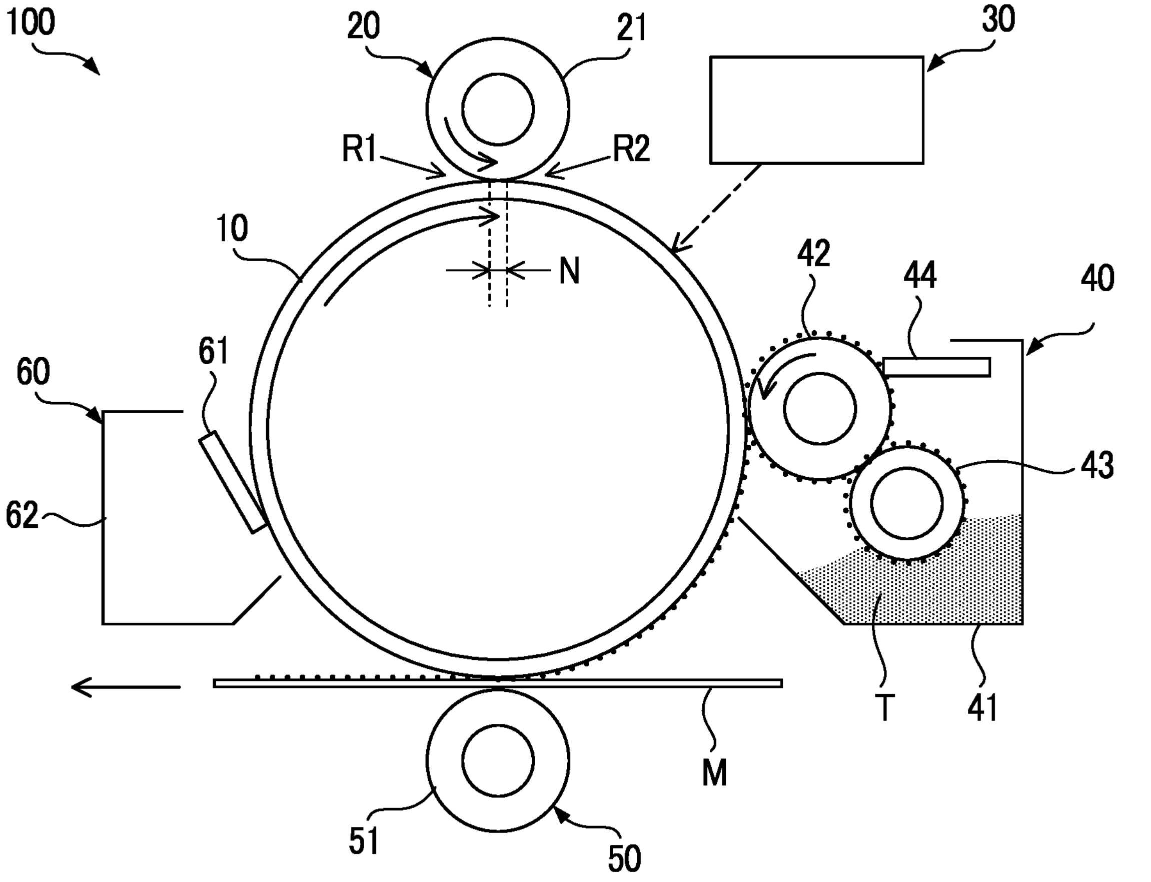
FIG. 1 is a schematic diagram showing an example of a configuration of an image forming apparatus according to an embodiment.

Preferred embodiments according to the present invention will be described with reference to the accompanying drawings. In the drawings, dimensions and a scale of elements may differ from those of actual products, and some elements may be shown schematically to facilitate understanding. The scope of the present invention is not limited to the embodiments described below unless the following explanation includes a description that specifically limits the scope of the present invention.

1. Image Forming Apparatus 100

FIG. 1 is a schematic diagram showing an example of a configuration of an image forming apparatus 100 with a conductive roller according to an embodiment. The image forming apparatus 100 is an apparatus, such as a copier or a printer, which forms an image on a recording medium M such as a paper for printing by an electrophotographic method.

As shown in FIG. 1, the image forming apparatus 100 includes a photoreceptor 10, a charging device 20, an exposure device 30, a developing device 40, a transfer device 50, a cleaning device 60, and a fusing device (not shown). Among the devices, the charging device 20, the exposure device 30, the developing device 40, the transfer device 50, and the cleaning device 60, are arranged in a circumferential direction of the photoreceptor 10 along an outer surface of the photoreceptor 10 in this sequence.

The photoreceptor 10 includes, as an outermost layer, a photosensitive layer formed of a photoconductive insulating material such as an organic photoreceptor (OPC), for example, the photoreceptor 10 in FIG. 1 is a cylindrical or columnar member (photoreceptor drum) configured to rotate about an axial line of the photoreceptor 10.

The charging device 20 is a device configured to have the outer surface of the photoreceptor 10 electrically charged evenly by electric discharge such as corona discharge. In the example shown in FIG. 1, the charging device 20 includes a charging roller 21 that is an example of the conductive roller, and in addition, the charging device 20 is configured to generate electric discharge, such as corona discharge, between the charging roller 21 and the photoreceptor 10. The charging roller 21 is in contact with the outer surface of the photoreceptor 10, and thus, the electric discharge occurs at a region R1 or R2 close to a nip N formed by the contact.

The exposure device 30 is a device configured to form an electrostatic latent image on the outer surface of the photoreceptor 10 by exposing the charged outer surface of the photoreceptor 10 using light such as laser light in accordance with image information from an external device such as a personal computer.

The developing device 40 applies toner T to the electrostatic latent image formed on the outer surface of the photoreceptor 10 to visualize the latent image as a toner image, for example, the developing device 40 in FIG. 1 includes a container 41 configured to contain the toner T therein, a developing roller 42 configured to carry the toner T, a toner supply roller 43 configured to supply the toner T to the developing roller 42, and a regulation blade 44 configured to regulate an amount of the toner T carried by the developing roller 42.

The transfer device 50 is a device configured to transfer the toner image formed on the photoreceptor 10 to the recording medium M. In the example shown in FIG. 1, the transfer device 50 includes a transfer roller 51, and applies a predetermined bias to the transfer roller 51 to transfer the toner image on the photoreceptor 10 to the recording medium M conveyed between the photoreceptor 10 and the transfer roller 51.

The recording medium M on which the toner image has been transferred is heated and pressed by the fusing device (not shown). The toner image is fixed to the recording medium M by the heating and pressing processes. The fusing device is not particularly limited, and it may be one of various types of commonly known fusing devices including a fusing device using a roller fixing method, a fusing device using a film fixing method, a fusing device using a flash fixing method, etc.

The cleaning device 60 is a device configured to remove toner T that remains on the outer surface of the photoreceptor 10 after the transfer process. In the example shown in FIG. 1, the cleaning device 60 includes a cleaning blade 61 configured to scrape the toner T off the outer surface of the photoreceptor 10, and a collector 62 configured to collect the toner T scraped off by the cleaning blade 61. The cleaning device 60 may include a cleaning brush in place of the cleaning blade 61 or in addition to the cleaning blade 61.

2. Charging Roller 21

Figure 2:
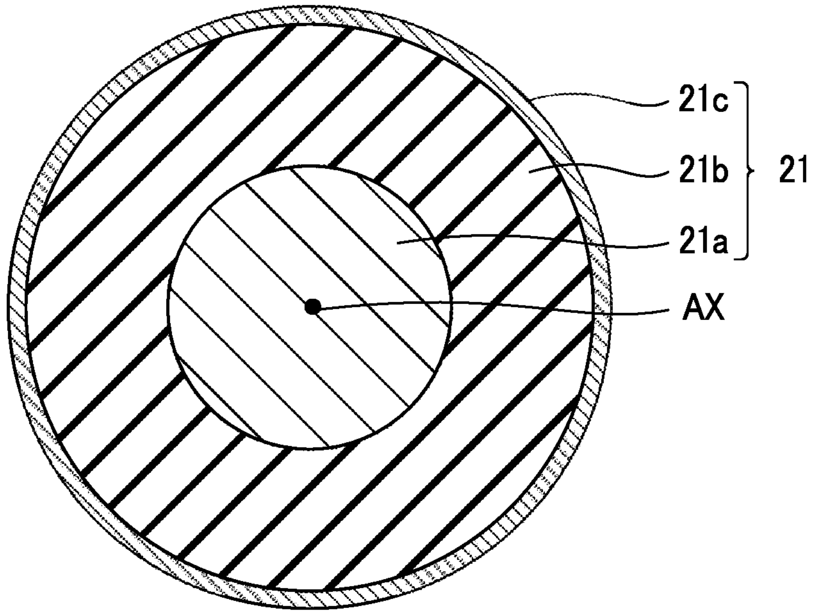
FIG. 2 is a cross-sectional view of a charging roller, which is an example of a conductive roller according to the embodiment.

FIG. 2 is a cross-sectional view of the charging roller 21, which is an example of the conductive roller according to the embodiment. As shown in FIG. 2, the charging roller 21 includes a core member 21*a*, an elastic layer 21*b*, and a surface layer 21*c*, and in addition, the charging roller 21 has a configuration in which the elastic layer 21*b* is interposed between the core member 21*a* and the surface layer 21*c*. Each of the elements of the charging roller 21 will be described sequentially.

2-1. Core Member 21*a*

The core member 21*a* is a columnar or cylindrical conductive member including an outer surface along and about an axial line AX of the core member 21*a*. The core member 21*a* has two ends, each of which may be provided with a shaft member for bearings, as appropriate.

The core member 21*a* is formed of a material having excellent thermal conductivity and mechanical strength. The material is not particularly limited, and examples of the material include a metallic material such as a stainless steel material, a nickel (Ni) material, a nickel alloy material, an iron (Fe) material, a magnetic stainless steel material, a cobalt-nickel (Co—Ni) alloy material, etc., and a resin material such as a polyimide resin (PI) material, etc., and in addition, one of these materials may be used alone, or alternatively, a combination of two or more of these materials may be used in a mixture, in a lamination, or in an alloy, etc.

The core member 21*a* is manufactured by, for example, a commonly known machining technique such as cutting. The surface of the core member 21*a* may undergo surface treatment such as blasting treatment or plating treatment, as appropriate.

2-2. Elastic Layer 21*b*

The elastic layer 21*b* is arranged over the entire outer surface of the core member 21*a*, and in addition, the elastic layer 21*b* is a layer having conductivity and elasticity. The elastic layer 21*b* is elastically deformed by contact between the charging roller 21 and the photoreceptor 10. In the region R1 or R2 close to the nip N formed by the contact between the charging roller 21 and the photoreceptor 10, the elastic deformation makes a distance between the outer surface of the charging roller 21 and the outer surface of the photoreceptor 10 equal in a direction along the axial line AX.

Figure 3:
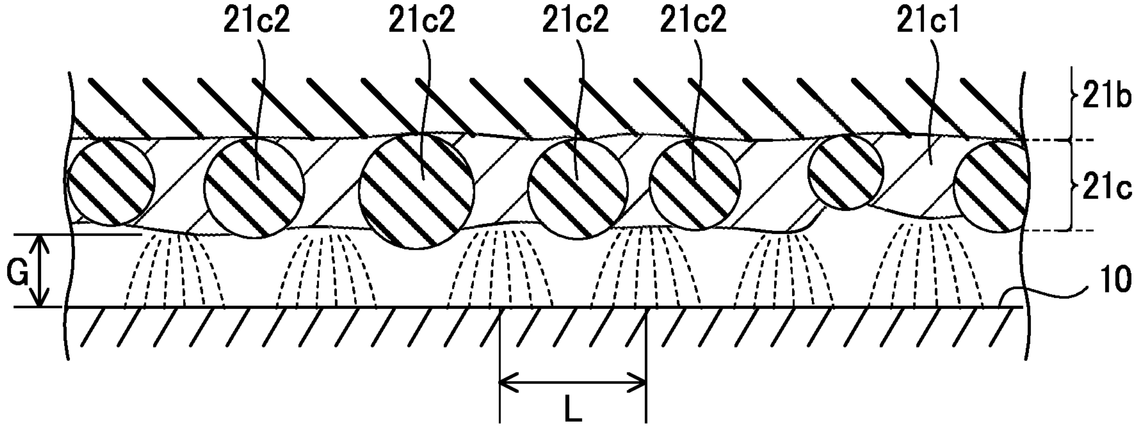
FIG. 3 is an enlarged cross-sectional view explaining a surface layer of the charging roller.

In the example shown in FIG. 3, the elastic layer 21*b* is a single layer; however, the elastic layer 21*b* may be a laminate having two or more layers. Between the core member 21*a* and the elastic layer 21*b*, another layer such as an adhesive layer that bonds these layers to each other, a sealing layer that improves sealing of these layers, or an adjustment layer that adjusts a surface condition of the core member 21*a*, may be interposed as appropriate.

Thickness of the elastic layer 21*b* is appropriately determined depending on a material of the elastic layer 21*b*, and it is not particularly limited, and may be, in order to achieve appropriate elasticity of the elastic layer 21*b*, for example, in a range of 0.5 mm or greater and 5 mm or less, and may be preferably in a range of 1 mm or greater and 3 mm or less.

When a non-contact method, in which the charging roller 21 is not in contact with the photoreceptor 10, is applied to the image forming apparatus 100, the elastic layer 21*b* may be omitted.

The elastic layer 21*b* is formed of, for example, a rubber composition in which a conductivity imparting agent is added to a rubber material. The elastic layer 21*b* may be a dense member formed of the rubber composition, or may be a foam member formed of the rubber composition.

The rubber material is not particularly limited, and may be, for example, a synthetic rubber material such as a polyurethane rubber (PUR) material, an epichlorohydrin rubber (ECO) material, a nitrile rubber (NBR) material, a styrene rubber (SBR) material, or a chloroprene rubber (CR) material, etc., and in addition, one of these materials may be used alone, or alternatively, a combination of two or more of these materials may be used in a copolymer or in a blend, etc.

The rubber material is not limited to a synthetic rubber material, and it may be a thermoplastic elastomer material. An additive such as a crosslinking agent or a crosslinking aid, etc., may be added to the rubber material, as appropriate. The crosslinking agent is not particularly limited, and examples of the crosslinking agent include sulfur and a peroxide vulcanizing agent, etc. Examples of the crosslinking aid include inorganic materials, such as zinc oxide and magnesium oxide, and organic materials, such as stearic acid and amines.

The conductivity imparting agent is not particularly limited, and examples of the conductivity imparting agent include an electronic conductivity imparting agent and an ionic conductivity imparting agent, and in addition, a combination of two or more of these agents may be used in a mixture, etc. The electronic conductivity imparting agent is not particularly limited, and examples of the electronic conductivity imparting agent include carbon black and metal powder, etc., and in addition, one of them may be used alone, or a combination of two or more thereof may be used. The ionic conductivity imparting agent is not particularly limited, and examples of the ionic conductivity imparting agent include an organic salt, an inorganic salt, a metal complex, and an ionic liquid. An example of the organic salt includes a sodium trifluoride acetate material, etc. Examples of the inorganic salt include a lithium perchlorate material and a quaternary ammonium salt, etc. An example of the metal complex includes a ferric halide-ethylene glycol material, as shown in Japanese Patent No. 3655364. The ionic liquid is a molten salt that is liquid at room temperature, and that has a melting point of 70 degrees Celsius or less, preferably 30 degrees Celsius or less, as shown in Japanese Patent Application Laid-open Publication No. 2003-202722.

Since the surface layer 21*c* described below is very thin, a shape of the surface of the elastic layer 21*b* tends to appear as a shape of the surface of the charging roller 21. Consequently, it is preferable that the surface of the elastic layer 21*b* be as smooth as possible. Specifically, a surface roughness Rz of the elastic layer 21*b* is preferably equal to or less than 8.5 micrometers, and more preferably equal to or less than 6 micrometers. The surface roughness Rz is in this range, so that effects of the shape of the surface layer 21*c* described below can be appropriately achieved. The surface roughness Rz means a ten-point height of irregularities according to JIS B 0601 (1994).

A durometer hardness of the elastic layer 21*b* is preferably in a range of 500 or greater and 64° or less. The durometer hardness of the elastic layer 21*b* is in this range, so that the effects of the shape of the surface layer 21*c* described below can be appropriately achieved. The durometer hardness is measured by use of a durometer "Type A" according to JIS K 6253 or ISO 7619.

The elastic layer 21*b* described above is formed by, for example, extrusion molding. This molding may be insert extrusion molding in which the core member 21*a* is used as an insert. In this case, joining of the core member 21*a* and the elastic layer 21*b* is performed simultaneously with the forming of the elastic layer 21*b*. Alternatively, the elastic layer 21*b* may be formed by bonding a sheet-shaped or tubular member, which is formed of the rubber composition described above, to the outer surface of the core member 21*a*. In forming the elastic layer 21*b*, thickness and surface roughness of the elastic layer 21*b* may be appropriately adjusted by grinding the outer surface of the elastic layer 21*b* using a grinding machine, etc., as appropriate.

2-3. Surface Layer 21*c*

The surface layer 21*c*, which is arranged over the entire outer surface of the elastic layer 21*b*, is a conductive layer with a roughened surface. The surface layer 21*c* is arranged, as an outermost layer of the charging roller 21, along the outer surface of the core member 21*a*. Thus, the surface layer 21*c*, which is arranged as the outermost layer of the charging roller 21, includes the roughened surface, so that corona charging is evenly generated between the charging roller 21 and the photoreceptor 10, compared to a configuration in which the surface of the surface layer 21*c* is a smooth surface.

FIG. 3 is an enlarged cross-sectional view explaining the surface layer 21*c* of the charging roller 21. As shown in FIG. 3, the surface layer 21*c* includes a conductive portion 21*cl* and a surface roughness imparting material 21*c*2 in the form of particles. The conductive portion 21*c*1 serves a function of generating electric discharge at the region R1 or R2 between the conductive portion 21*c* and the outer surface of the photoreceptor 10, and a function as a binder that fixes the surface roughness imparting material 21*c*2, which is in a dispersed state, to the elastic layer 21*b*. On the other hand, the surface roughness imparting material 21*c*2 serves a function of roughening the surface of the surface layer 21*c*. The conductive portion 21*cl* and the surface roughness imparting material 21*c*2 will be sequentially described in detail.

The conductive portion 21*cl* is formed of a conductive resin composition in which a conductive agent is added to a resin material that is a base material. The resin composition may include another additive such as a modifier, etc.

The resin material is not particularly limited, and examples of the resin material include an urethane resin material, an acrylic resin material, an acrylic urethane resin material, an amino resin material, a silicone resin material, a fluororesin material, a polyamide resin material, an epoxy resin material, a polyester resin material, a polyether resin material, a phenolic resin material, a urea resin material, a polyvinyl butyral resin material, a melamine resin material, and a nylon resin material, etc. One of these base materials may be used alone, or alternatively, a combination of two or more of these materials may be used in a copolymer or in a blend, etc.

The conductive agent is not particularly limited, and examples of the conductive agent include carbon black such as acetylene black, Ketjen black, and Tokablack, etc., carbon nanotube, lithium salt such as a lithium perchlorate material, etc., ionic liquid such as 1-butyl-3-methylimidazolium hexafluorophosphate, etc., metal oxide material such as a tin oxide material, etc., and conductive polymer. One of these conductive agents may be used alone, or alternatively, a combination of two or more of these conductive agents may be used in a mixture, etc.

The surface roughness imparting material 21*c*2 is not particularly limited, and examples of the surface roughness imparting material 21*c*2 include acrylic particles, urethane particles, polyamide resin particles, silicone resin particles, fluororesin particles, styrene resin particles, phenol resin particles, polyester resin particles, olefin resin particles, epoxy resin particles, nylon resin particles, carbon particles, graphite particles, carbon balloons, silica particles, alumina particles, titanium oxide particles, zinc oxide particles, magnesium oxide particles, zirconium oxide particles, calcium sulfate particles, calcium carbonate particles, magnesium carbonate particles, calcium silicate particles, aluminum nitride particles, boron nitride particles, talc particles, kaolin clay particles, diatomaceous earth particles, glass beads, and hollow glass spheres, etc. One kind of particle among these kinds of particles may be used alone, or alternatively, a combination of two or more kinds of particles among these kinds of particles may be used.

As described above, the charging roller 21, which is an example of the conductive roller, includes the core member 21*a* including the outer surface along and about the axial line AX, and the surface layer 21*c* arranged along the outer surface of the core member 21*a*. As described above, the surface layer 21*c* includes the conductive portion 21*cl* having conductivity, and the surface roughness imparting material 21*c*2 in a form of particles dispersed in the conductive portion 21*c*1.

An average particle size of the surface roughness imparting material 21*c*2 is in a range of 6 micrometers or greater and 10 micrometers or less. The number of particles of the surface roughness imparting material 21*c*2 per unit area of the surface layer 21*c* is in a range of $1.0\times10^4$ particles per $mm^2$ or greater and $2.0\times10^6$ particles per $mm^2$ or less. An average thickness of the surface layer 21*c* is in a range of 3.0 micrometers or greater and 15.0 micrometers or less.

The range of the average particle size of the surface roughness imparting material 21*c*2, the range of the number of particles of the surface roughness imparting material 21*c*2 per unit area of the surface layer 21*c*, and the range of the average thickness of the surface layer 21*c* are defined as described above, so that electricity can be evenly charged or discharged to the outer surface of the photoreceptor 10 by using the charging roller 21.

Specifically, the number of particles of the surface roughness imparting material 21*c*2 per unit area of the surface layer 21*c* has a higher correlation with a distance between protrusions due to the surface roughness imparting material 21*c*2 than a mean spacing between peaks Sm. Accordingly, variations in distance L between discharging points are reduced regardless of a shape of the conductive portion 21*c*1, compared to a conventional technique in which a mean spacing between peaks Sm is defined.

The average particle size of the surface roughness imparting material 21*c*2 has a higher correlation with a height of protrusions due to the surface roughness imparting material 21*c*2 than a ten-point height of irregularities RZ. Consequently, variations in discharge gap G are reduced regardless of a shape of the conductive portion 21*c*1, compared to a conventional technique in which a ten-point height of irregularities RZ is defined. In order to reduce variations in discharge gap G, it is preferable that a standard deviation (variation) of the particle size of the surface roughness imparting material 21*c*2 be as small as possible; specifically, the standard deviation of the particle size is preferably equal to or less than 1.5 micrometers, and it is more preferably equal to or less than 1 micrometers.

Furthermore, since a relationship between the average thickness of the surface layer 21*c* and the average particle size of the surface roughness imparting material 21*c*2 is defined, protrusions, each of which has a desired height, due to the surface roughness imparting material 21*c*2 can be obtained. Therefore, a discharge gap G with a desired length can be obtained.

As described above, the range of the average particle size of the surface roughness imparting material 21*c*2, the range of the number of particles of the surface roughness imparting material 21*c*2 per unit area of the surface layer 21*c*, and the range of the average thickness of the surface layer 21*c* are defined, consequently, a desired discharge gap G and a desired distance L between discharging points can be obtained. As a result, electricity can be evenly charged or discharged to the outer surface of the photoreceptor 10 by using the charging roller 21.

When the average particle size of the surface roughness imparting material 21*c*2, the average thickness of the surface layer 21*c*, and the number of particles of the surface roughness imparting material 21*c*2 per unit area of the surface layer 21*c* are measured, it is possible to determine, based on the measurement results, whether characteristics of the charging roller 21 are good. In other words, based on the measurement results being in the ranges described above, it is determined that the characteristics of the charging roller 21 are good. As described above, it is possible to provide an inspection method, which is capable of determining whether the charging roller 21 is good, without evaluation of quality of images output from the image forming apparatus 100 in which the charging roller 21 is actually installed.

As described above, the charging roller 21 according to the embodiment includes the conductive elastic layer 21*b* arranged between the core member 21*a* and the surface layer 21*c*. With this configuration, based on the charging roller 21 being in contact with the outer surface of the photoreceptor 10, the distance between the outer surface of the photoreceptor 10 and the outer surface of the charging roller 21 can be even in the direction along the axial line AX.

It is preferable that the surface roughness imparting material 21*c*2 be formed of insulating particles. In this case, it is possible to reduce electric discharge to protrusions due to the surface roughness imparting material 21*c*2. In the example shown in FIG. 3, the surface roughness imparting material 21*c*2 is partially exposed to an outside from the conductive portion 21*c*1; however, the surface roughness imparting material 21*c*2 may be embedded entirely in the conductive portion 21*c*1.

As described above, the conductive portion 21*c* is formed of the resin composition including the resin material and the conductive agent, consequently, the conductive portion 21*cl* appropriately serves the function of generating electric discharge at the region R1 or R2 between the conductive portion 21*cl* and the outer surface of the photoreceptor 10, and the function of fixing the surface roughness imparting material 21*c*2, which is in a dispersed state, to the elastic layer 21*b*.

As described above, in the image forming apparatus 100 including the charging roller 21 and the photoreceptor 10, the charging roller 21 has the outer surface of the photoreceptor 10 electrically charged by applying a voltage between the charging roller 21 and the outer surface of the photoreceptor 10. The voltage, in other words, a charging voltage, may be a DC voltage, or may be a voltage obtained by superimposing an AC voltage on a DC voltage. In a case in which the charging voltage is a DC voltage, compared to a case in which the charging voltage is a voltage obtained by superimposing an AC voltage on a DC voltage, charging unevenness in general readily occurs; however, according to the present invention, it is possible to reduce charging unevenness even when the charging voltage is a DC voltage.

The surface layer 21*c* described above is formed from a coating liquid in which the resin composition described above is dissolved in a solvent, and in addition, in which the surface roughness imparting material described above is dispersed. Specifically, the coating liquid is applied onto the outer surface of the elastic layer 21*b*, and it is then cured or solidified, thereby forming the surface layer 21*c*.

A method of applying the coating liquid is not particularly limited, and examples of the method include a dip coating method, a roller coating method, and a spray coating method, etc. To cure or solidify the coating liquid, a heating treatment, an ultraviolet irradiation treatment, etc., may be performed as appropriate.

The solvent to be used for the coating liquid is not particularly limited, and examples of the solvent include an aqueous-based solvent such as water, etc., an ester-based solvent such as methyl acetate, ethyl acetate, or butyl acetate, etc., a ketone-based solvent such as methyl ethyl ketone (MEK) or methyl isobutyl ketone (MIBK), etc., an alcohol-based solvent such as methanol, ethanol, butanol, or 2-propanol (IPA), etc., a hydrocarbon-based solvent such as acetone, toluene, xylene, hexane, or heptane, etc., and a halogenated solvent such as chloroform, etc. One of these solvents may be used alone, or alternatively, a combination of two or more of these solvents may be used in a mixture, etc.

As described above, the surface layer 21*c* is formed by curing or solidifying the coating agent including the surface roughness imparting material 21*c*2. The number of particles of the surface roughness imparting material 21*c*2 per unit area of the surface layer 21*c* can be calculated based on an area of the surface layer 21*c*, an inclusion rate of the surface roughness imparting material 21*c*2 in the coating agent, a mass of the coating agent used to form the surface layer 21*c*, and an average mass of the surface roughness imparting material 21*c*2 per particle. Consequently, even without using a device such as a microscope, the number of particles of the surface roughness imparting material 21*c*2 per unit area of the resulting surface layer 21*c* can be ascertained. Therefore, when the thickness of the surface layer 21*c* and the average particle size of the surface roughness imparting material 21*c*2 are already known, it is possible to determine, by use of the inspection method described above, whether the characteristics of the charging roller 21 are good.

The average mass of the surface roughness imparting material 21*c*2 per particle is calculated based on, for example, the density of a material making up the surface roughness imparting material 21*c*2, and the volume of the surface roughness imparting material 21*c*2 per particle. The volume of the surface roughness imparting material 21*c*2 per particle is calculated based on, for example, the average particle size of the surface roughness imparting material 21*c*2.

3. Modifications

The embodiment described above may be variously modified. Specific modifications, which can be applied to the embodiment described above, are described below. Two or more modifications freely selected from the following modifications may be combined as long as no conflict arises from such combination.

3-1. First Modification

In the embodiments described above, an example of a case is shown in which the conductive roller according to the present invention is applied to the charging roller; however, the present invention is not limited to this example. The conductive roller according to the present invention is applicable to, for example, a developing roller, a transfer roller, a static electrical charge elimination roller, a toner supply roller, etc., in addition to the charging roller of the image forming apparatus such as an electrophotographic copier or printer.

3-2. Second Modification

In the embodiment described above, a configuration is shown in which the charging roller is in contact with the outer surface of the photoreceptor; however, the present invention is not limited to the configuration, and a configuration may be used in which the conductive roller is close to the outer surface of the photoreceptor. For example, in a case in which the conductive roller is a developing roller, a developing method may be a contact method or a non-contact method.

3-3. Third Modification

In the embodiment described above, an example of a case is shown in which the image forming apparatus according to the present invention is a monochromatic image forming apparatus; however, the image forming apparatus is not limited to this example. For example, the image forming apparatus according to the present invention is applicable to a color image forming apparatus in addition to a monochromatic image forming apparatus. The color image forming apparatus may use a rotary developing method or a tandem developing method. In a case in which the image forming apparatus includes intermediate transfer elements, the conductive roller may be applied to a primary transfer roller or to a secondary transfer roller. Furthermore, the image forming apparatus may use either wet toner or dry toner, and the toner may be a magnetic or a non-magnetic one-component developer or a two-component developer.

EXAMPLES

Specific examples of the present invention will be described below. The present invention is not limited to the following examples.

A. Manufacture of Conductive Roller

A-1. First Example

Manufacture of Elastic Layer

First, a rubber composition was kneaded with a roller mixer. The rubber composition included the following constituents.

- Epichlorohydrin rubber ("Epichlomer CG-102" manufactured by Osaka Soda Co., Ltd.) used as a rubber material: 100 parts by mass
- Sodium trifluoroacetate used as a conductivity imparting agent: 0.5 parts by mass
- Zinc oxide used as a crosslinking aid: 3 parts by mass
- Stearic acid used as a crosslinking aid: 2 parts by mass
- Crosslinking agent: 1.5 parts by mass The kneaded rubber composition was formed into a sheet-shaped material, and it was then wound around the surface of a core member that was made of stainless steel and that had a diameter of 8 mm, and it was then press-molded to form a layer made of crosslinked epichlorohydrin rubber. Thereafter, the surface of the layer was ground with a grinding machine to form an elastic layer having a thickness of 2.0 mm. In the grinding process, after the thickness of the elastic layer became a predetermined thickness, the rotation speed of a grinding wheel of the grinding machine was increased in sequence from 1000 rpm, to 2000 rpm, to 3000 rpm to grind the surface of the elastic layer by dry grinding so as to minimize the surface roughness of the elastic layer.

The hardness of the resulting elastic layer was measured using a durometer "Type A" according to JIS K 6253 or ISO 7619; as a result, the measured hardness was in a range from 500 to 64°.

Manufacture of Surface Layer

First, a coating liquid for forming a surface layer was prepared. The coating liquid included the following constituents.

- Ethyl acetate used as a diluted solvent
- Urethane resin [polyol ("T5650E" manufactured by Asahi Kasei Chemicals Corp.) and isocyanurate ("TPA-100" manufactured by Asahi Kasei Chemicals Corp.) used as a resin material
- Carbon dispersion liquid ["MHI-BK" (carbon inclusion rate of 20 to 30% by mass) manufactured by Mikuni Color Ltd.] used as a conductive material
- Acrylic silicone polymer ("modiper FS700" manufactured by NOF Corp.) used as an additive
- Urethane beads ("C-600" manufactured by Negami Chemical Industrial Co., Ltd.) used as a surface roughness imparting agent with an average particle size of 10 micrometers and with a density of 1160 kg/m$^3$ The coating liquid having an appropriate combination ratio of the constituents described above was stirred using a ball mill for 3 hours.

By forming a surface layer on the outer surface of the elastic layer described above using the coating liquid, a conductive roller was formed. Specifically, the stirred coating liquid was applied by spray coating on the outer surface of the elastic layer, and it was then dried in an electric furnace at 120° C. for 60 minutes to form the surface layer having an average thickness of 4.5 micrometers.

The amount of the coating liquid used per conductive roller was 2.1 g. Consequently, based on the amount of the used coating liquid and the combination ratio of the surface roughness imparting material in the coating liquid described above, the number of particles of the surface roughness imparting material including in the surface layer of a single conductive roller was calculated; as a result, the calculation value was $1\times10^8$ particles per roller.

The elastic layer had an outer diameter of 9.5 mm, and the coating liquid was applied over a region of the elastic layer having a length of 225 mm in an axial direction of the elastic layer. Consequently, based on an area to which the coating liquid is applied, in other words, an area of the surface layer becoming $9.5\times\pi\times225$ [mm$^2$], the number of particles of the surface roughness imparting material per unit area of the surface layer was calculated; as a result, the calculation value was $1.5\times10^4$ [particles per m$^2$].

The average thickness of the surface layer was measured by, first, observing a cross section of the elastic layer and a cross section of the surface layer taken along a line in their thickness direction with a laser microscope ("VK-X200" manufactured by Keyence Corporation), and then, measuring distances from the surface of the conductive roller to a boundary between the surface layer and the elastic layer at 20 different points in a circumferential direction of the conductive roller, and then, calculating an average value of the measured distances.

A-2. Second to Seventh Examples, and First to Third Comparative Examples

Conductive rollers according to second to seventh examples, and conductive rollers according to first to third comparative examples were manufactured in substantially the same manner as the first example, except that the combination ratio of the constituents of the coating agent was changed such that the average particle size of the surface roughness imparting material, the number of particles of the surface roughness imparting material in the surface layer, and the average thickness of the surface layer were values as listed in Table 1. The combination ratio of the constituents of the coating agent was adjusted such that the amount of the coating liquid used per conductive roller was 2.1 g.

TABLE 1

| | Surface layer | | | | Evaluation | | |
|---|---|---|---|---|---|---|---|
| | Surface roughness imparting material | | | | Image unevenness | | |
| | Average particle size [μm] | Number of particles [particles/roller] | Number of particles [particles/mm2] | Average thickness [μm] | Local electric discharge | Scumming | Overall evaluation |
| First example | 10 | 1.0E+08 | 1.5E+04 | 4.5 | P | P | P |
| Second example | 10 | 2.4E+08 | 3.6E+04 | 10.3 | P | P | P |
| Third example | 10 | 7.8E+07 | 1.2E+04 | 3.4 | P | P | P |
| Fourth example | 6 | 7.7E+09 | 1.1E+06 | 7.2 | P | P | P |
| Fifth example | 6 | 7.4E+09 | 1.1E+06 | 13.9 | P | P | P |
| Sixth example | 10 | 1.2E+08 | 1.8E+04 | 5.2 | P | P | P |
| Seventh example | 6 | 4.3E+08 | 6.4E+04 | 4.0 | P | P | P |
| First comparative example | 10 | 3.7E+08 | 5.5E+04 | 16.2 | F | F | F |
| Second comparative example | 15 | 1.4E+08 | 2.1E+04 | 20.1 | F | F | F |
| Third comparative example | 15 | 1.5E+08 | 2.2E+04 | 1.1 | F | F | F |

Table 1 lists the average particle size of the surface roughness imparting material, the number of particles of the surface roughness imparting material in the surface layer, and the average thickness of the surface layer for each of the examples and for each of the comparative examples, along with results of evaluation described below.

In the fourth, fifth, and seventh examples, urethane beads ("C-800" manufactured by Negami Chemical Industrial Co., Ltd.) were used as a surface roughness imparting material with an average particle size of 6 micrometers. In the second and third examples, urethane beads ("C-400" manufactured by Negami Chemical Industrial Co., Ltd.) were used as a surface roughness imparting material with an average particle size of 15 micrometers.

B. Evaluation of Conductive Rollers

Image unevenness was evaluated for images printed by a copier ("bizhub C3850" manufactured by Konica Minolta Inc.) used the conductive roller according to each of the examples or each of the comparative examples as a charging roller. The copier was a color multifunctional printer (MFP) configured to use a voltage, which is a DC voltage, as a charging voltage.

In an evaluation described below, a normal charging voltage was measured with a tester, and then a voltage, which was lower than the normal charging voltage by 100 V, was applied as the charging voltage to the charging roller by way of an external power supply. Printing was performed at a print rate of 38 sheets per minute at an environmental temperature of 23° C. and a humidity of 55%.

B-1. Presence or Absence of Image Unevenness Caused by Local Electric Discharge Halftone images were printed, and then evaluation was performed by visually determining, based on the following criteria, whether white spots, black spots, white streaks, or black streaks, which appeared on the printed images as image unevenness caused by local electric discharge, were present. A summary of the evaluation results is shown in Table 1 described above.

Criteria

P: No image unevenness caused by local discharge.

F: Image unevenness caused by local discharge.

B-2. Presence or Absence of Image Unevenness Caused by Scumming

White solid images were printed, and then the L* value (lightness) was measured at seven points in each white solid image by a Chroma Meter ("CR-400" manufactured by Konica Minolta Inc.), and then, based on the measured results, evaluation was performed by determining, in accordance with the following criteria, whether image unevenness caused by scumming was present. A summary of the evaluation results is shown in Table 1 described above.

Criteria

P: No scumming (equal to or greater than L*95.5)

F: Scumming (less than L*95.5)

The "scumming" is also referred to as "fogging," and means printing on a non-print area. When scumming appears on a printed solid white image, lightness of the printed image decreases.

B-3. Overall Evaluation

Overall evaluation was defined as P in a case in which the evaluation in B-1 described above and the evaluation in B-2 described above were both P, whereas the overall evaluation was defined as F in cases other than the case described above. A summary of the evaluation results is shown in Table 1 described above.

It is understood from the above evaluation results that image unevenness could be reduced in each of the examples as shown in Table 1. In contrast to this results, image unevenness appeared in each of the comparative examples.

DESCRIPTION OF REFERENCE SIGNS

10 . . . photoreceptor, 20 . . . charging device, 21 . . . charging roller, 21*a* . . . core member, 21*b* . . . elastic layer, 21*c* . . . surface layer, 21*c*1 . . . conductive portion, 21*c*2 . . . surface roughness imparting material, 30 . . . exposure device, 40 . . . developing device, 41 . . . container, 42 . . . developing roller, 43 . . . toner supply roller, 44 . . . regulation blade, 50 . . . transfer device, 51 . . . transfer roller, 60 . . . cleaning device, 61 . . . cleaning blade, 62 . . . collector, 100 . . . image forming apparatus, AX . . . axial line, G . . . discharge gap, L . . . distance between discharging points, M . . . recording medium, N . . . nip, R1 . . . region, Sm . . . mean spacing between peaks, T . . . toner.

The invention claimed is:

1. An inspection method for a conductive roller, the inspection method comprising:

a first process, and a second process, wherein:

the inspection method is an inspection method for determining whether characteristics of the conductive roller are good, the conductive roller includes:

a core member including an outer surface along and about an axial line thereof; and a surface layer arranged along the outer surface of the core member, the surface layer includes:

a conductive portion; and a surface roughness imparting material in a form of particles dispersed in the conductive portion, an average particle size of the surface roughness imparting material is in a range of 6 micrometers or greater and 10 micrometers or less, an average thickness of the surface layer is in a range of 3.0 micrometers or greater and 15.0 micrometers or less, the first process includes calculating a number of particles of the surface roughness imparting material per unit area of the surface layer; and the second process includes determining, based on the number of particles being in a range of $1.0\times10^4$ particles per $mm^2$ or greater and $2.0\times10^6$ particles per $mm^2$ or less, that the characteristics of the conductive roller are good.

2. The inspection method for the conductive roller according to claim 1, wherein:

the surface layer is formed by curing or solidifying a coating agent including the surface roughness imparting material, the calculating the number of particles includes calculating the number of particles of the surface roughness imparting material per unit area of the surface layer based on:

an area of the surface layer;

an inclusion rate of the surface roughness imparting material in the coating agent, a mass of the coating agent used to form the surface layer, and an average mass of the surface roughness imparting material per particle.

3. The inspection method for the conductive roller according to claim 1, further comprising:

in the first process, the number of particles of the surface roughness imparting material per unit area of the surface layer is calculated to be in the range of $1.0\times10^4$ particles per $mm^2$ or greater and $2.0\times10^6$ particles per $mm^2$ or less.

4. The inspection method for the conductive roller according to claim 1, further comprising:

the surface roughness imparting material of the conductive roller including an insulating material.

5. A method for producing a conductive roller, the method comprising:

a formation process that includes forming a surface layer of the conductive roller; and a determination process that includes determining whether characteristics of the conductive roller are good, wherein the conductive roller includes:

a core member including an outer surface along and about an axial line thereof; and the surface layer arranged along the outer surface of the core member, wherein the surface layer includes:

a conductive portion; and a surface roughness imparting material in a form of particles dispersed in the conductive portion, wherein an average particle size of the surface roughness imparting material is in a range of 6 micrometers or greater and 10 micrometers or less, wherein an average thickness of the surface layer is in a range of 3.0 micrometers or greater and 15.0 micrometers or less, wherein the determining whether characteristics of the conductive roller are good includes:

calculating a number of particles of the surface roughness imparting material per unit area of the surface layer; and determining, based on the number of particles being in a range of $1.0\times10^4$ particles per $mm^2$ or greater and $2.0\times10^6$ particles per $mm^2$ or less, that the characteristics of the conductive roller are good.

6. The method according to claim 5, wherein the forming the surface layer includes forming the surface layer by curing or solidifying a coating agent including the surface roughness imparting material, and wherein the calculating the number of particles includes calculating the number of particles of the surface roughness imparting material per unit area of the surface layer based on:

an area of the surface layer;

an inclusion rate of the surface roughness imparting material in the coating agent;

a mass of the coating agent used to form the surface layer; and an average mass of the surface roughness imparting material per particle.

7. The method according to claim 5, further comprising: the conductive roller including a conductive elastic layer arranged between the core member and the surface layer.

8. The method according to claim 5, further comprising: the surface roughness imparting material being formed of an insulating material.

9. The method according to claim 5, further comprising: the conductive portion being formed of a resin composition including a resin material and a conductive agent.

10. The method according to claim 5, further comprising:

in the calculation, the number of particles of the surface roughness imparting material per unit area of the surface layer is calculated to be in the range of $1.0\times10^4$ particles per $mm^2$ or greater and $2.0\times10^6$ particles per $mm^2$ or less.

* * * * *